(12) United States Patent
Huebler et al.

(10) Patent No.: US 6,745,745 B2
(45) Date of Patent: Jun. 8, 2004

(54) COMBUSTION CHAMBER FOR REVERSE TUMBLE SPARK IGNITION DIRECT INJECTION ENGINE

(75) Inventors: Mark Steven Huebler, Shelby Township, Macomb County, MI (US); Alexander Millerman, Bloomfield Hills, MI (US); Ronald M. Otto, Rochester Hills, MI (US); Arun Sushilkumar Paulraj Solomon, Rochester Hills, MI (US); Gerald Andrew Szekely, Jr., Sterling Heights, MI (US); Ping-Ho Tsai, Troy, MI (US)

(73) Assignee: General Motors Corporation, Detroit, MI (US)

( * ) Notice: Subject to any disclaimer, the term of this patent is extended or adjusted under 35 U.S.C. 154(b) by 160 days.

(21) Appl. No.: 10/080,429

(22) Filed: Feb. 22, 2002

(65) Prior Publication Data

US 2003/0159675 A1 Aug. 28, 2003

(51) Int. Cl.[7] ................................................. F02B 31/00
(52) U.S. Cl. ....................................... 123/307; 123/306
(58) Field of Search ................................. 123/306–309

(56) References Cited

U.S. PATENT DOCUMENTS

| | | | |
|---|---|---|---|
| 5,305,720 A | | 4/1994 | Ando et al. ............... 123/193.4 |
| 5,711,269 A | | 1/1998 | Oda et al. ..................... 123/262 |
| 5,727,520 A | * | 3/1998 | Wirth et al. .................. 123/305 |
| 5,806,482 A | * | 9/1998 | Igarashi et al. .............. 123/259 |
| 5,816,215 A | | 10/1998 | Yoshikawa et al. ......... 123/301 |
| 6,095,114 A | | 8/2000 | Horie et al. ................. 123/298 |
| 6,116,211 A | | 9/2000 | Suzuki et al. ............... 123/305 |
| 6,129,065 A | | 10/2000 | Ueda et al. .............. 123/193.6 |
| 6,223,715 B1 | * | 5/2001 | Suzuki ........................ 123/294 |

FOREIGN PATENT DOCUMENTS

| | | | |
|---|---|---|---|
| EP | 0 261 538 | 3/1988 | ............. F02F/3/26 |
| EP | 0 902 180 | 3/1999 | ............. F02F/3/00 |

OTHER PUBLICATIONS

"Development of Gasoline Direct Injection Engine", Mitsbushi Motors Corp., #970541, Authors: Y. Iwamoto et al.

"A Direct Injection Stratified Charge Gasoline Combustion System for Future European Passenger Cars", Authors: N. S. Jackson et al. (Richardo Consulting Entineers Ltd., presented Dec. 3–4, 1996 at I. Mech E. Lean Burn Combustion Engines Seminar.

"Mixing Control Strategy forEngine Performance Improvement in a Gasoline Direct Injection Engine" Mitsubishi Motors Corp., #980158, Authors: Kazunari Kuwahara eta al., presented on Feb. 23–26, 1998 at the International Congress and Exposition.

"Combustion Control Technologies for Direct Injection SI Engine", Mitsubishi Motors Corp., #960600, Authors: T Kume et al...

* cited by examiner

Primary Examiner—Mahmoud Gimie
Assistant Examiner—Arnold Castro
(74) Attorney, Agent, or Firm—Kathryn A. Marra

(57) ABSTRACT

Superior piston bowl and combustion chamber configurations are designed for a reverse tumble spark ignition direct injection engine. The piston includes a shallow bowl extending from adjacent an edge of the piston head to an inner side slightly beyond a peak. The bowl features a bowl lip re-entrant angle at the spark plug location having an open or positive re-entrant angle. On lateral edges of the bowl between the inner and outer edges, wing like extensions include negative re-entrant angles. These help contain the injected fuel within the bowl during combustion. Other features of the combustion chamber include vertical intake ports that produce a weak reverse tumbling air flow motion with a tumble ratio of about 0.6, which allows increased flow efficiency of the port. An injector spray cone angle of 90 degrees is preferred with a bowl sized to capture the spray. Various additional features are disclosed.

15 Claims, 2 Drawing Sheets

COMBUSTION CHAMBER FOR REVERSE TUMBLE SPARK IGNITION DIRECT INJECTION ENGINE

TECHNICAL FIELD

This invention relates to direct injection spark ignition engines and, more particularly, to a piston and combustion chamber for a reverse tumble direct injection engine of the spark ignition type.

BACKGROUND OF THE INVENTION

Various types of direct injection spark ignition engines have been developed in efforts to provide improved fuel efficiency combined with acceptable control of exhaust emissions. Among these are engines utilizing stratified charge preparation involving horizontal cylinder swirl around a vertical axis, forward tumble involving vertical swirl from the combustion chamber center toward the outer edge around a horizontal axis, and reverse tumble involving cylinder swirl around a horizontal axis from the outer edge of the combustion chamber toward the center. While so called swirl type engines have had possibly the most development and interest, recent attention has also involved both forward and reverse tumble stratified charge preparation. Development of improved engines of the stratified charge type for use in future vehicle production appears desirable in order to meet continuing requirements for increased efficiency and emission control in the combustion process.

SUMMARY OF THE INVENTION

The present invention provides superior piston bowl and combustion chamber configurations for a reverse tumble spark ignition direct injection engine. The piston design includes a head end having a raised pedestal with dual shallow upwardly angled intake and exhaust faces intersecting at a linear peak. A shallow bowl is formed primarily in the intake face and extending from an outer side adjacent an edge of the head end of the piston to an inner side slightly beyond the peak.

The bowl features a bowl lip re-entrant angle at the spark plug location on the inner side of the bowl having an open or positive re-entrant angle in a range from about +10 to +15 degrees. On lateral edges of the bowl between the inner and outer edges, wing like extensions are provided which include negative re-entrant angles, preferably in a range from about −15 to −20 degrees. These are effective in containing the injected fuel within the bowl during combustion. Other features of the combustion chamber include vertical intake ports that produce a weak reverse tumbling air flow motion with a tumble ratio of about 0.6 which allows increased flow efficiency of the port.

An injector spray cone angle of 90 degrees is preferred which is combined with a bowl sized to optimally capture the 90 degree cone angle spray after accounting for the spray's collapse at chamber back pressures typical of late injection timings for this type of engine. Too large a bowl width causes the mixture within the bowl to become too lean at the side extremes of the bowl and cause unburned hydrocarbon emissions to increase. Too narrow a piston bowl width causes part of the spray not to enter the bowl and be captured, which also causes an increase in hydrocarbon emissions. An injector mounted in the side of the cylinder head at an angle of about 47 degrees is presently preferred.

The piston provides a mixture preparation surface approaching the central spark plug location which features a large radius of curvature that promotes even spreading of the fuel in a 360 degree pattern after the fuel spray impacts on the surface of the bowl. It helps the soft spray, which has very low momentum to begin with, to travel on toward the spark plug and insure the existence of fuel air mixture at the spark plug gap at the time of ignition. Too small a radius of curvature decelerates the spray and compromises the ignition timing as well as the ignition process itself. Too large a radius of curvature causes a large fraction of the fuel vapor to escape beyond the spark plug gap into the squish region on the exhaust side of the chamber and results in poor ignition and unburned hydrocarbon emissions. Specific recommended dimensions and features for a preferred embodiment of the invention are provided and are discussed subsequently.

These and other features and advantages of the invention will be more fully understood from the following description of certain specific embodiments of the invention taken together with the accompanying drawings.

DESCRIPTION OF THE PREFERRED EMBODIMENT

Figure 1:
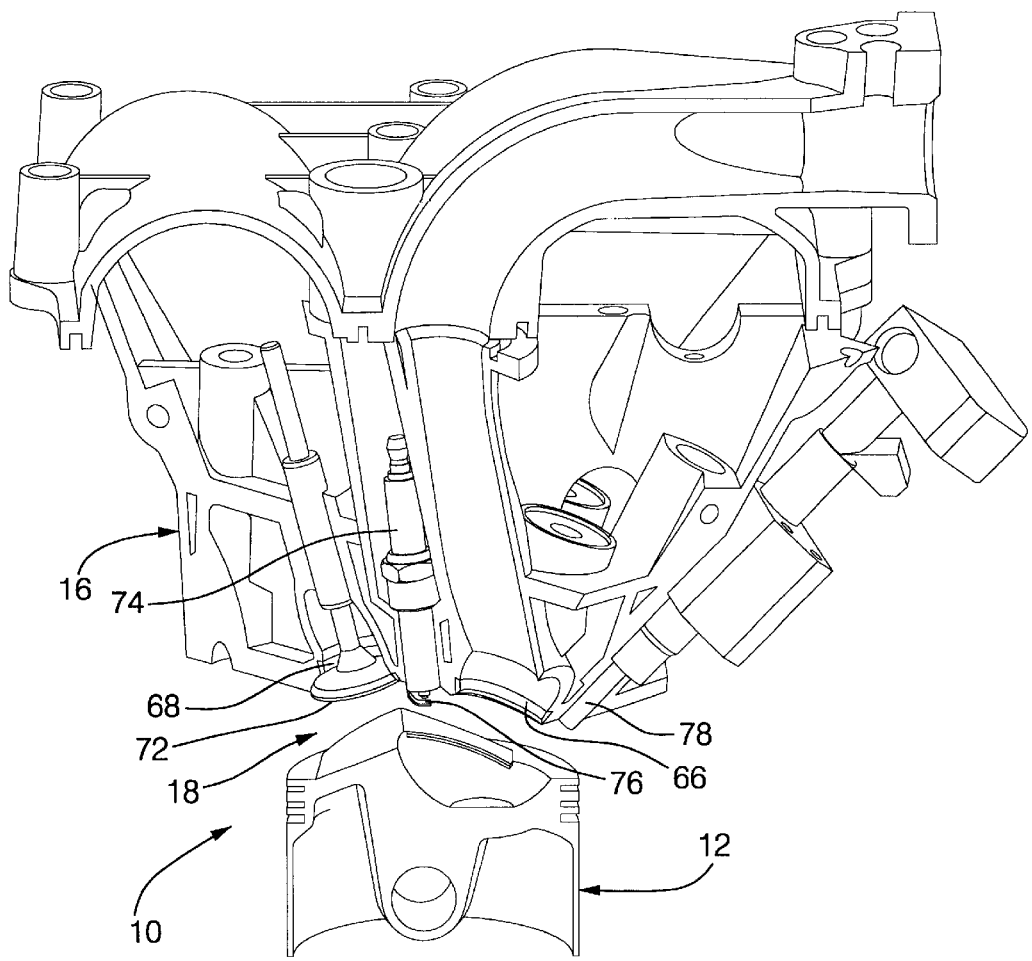
FIG. 1 is an exploded pictorial view of the engine piston and cylinder head structure with the cylinder liner omitted for clarity.
Figure 2:
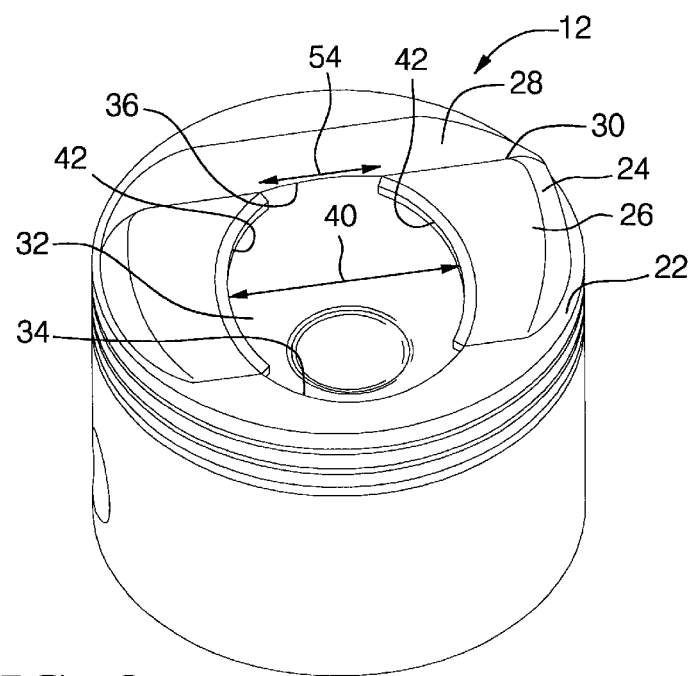
FIG. 2 is a pictorial view of a piston according to the invention viewed from above the piston bowl side.
Figure 3:
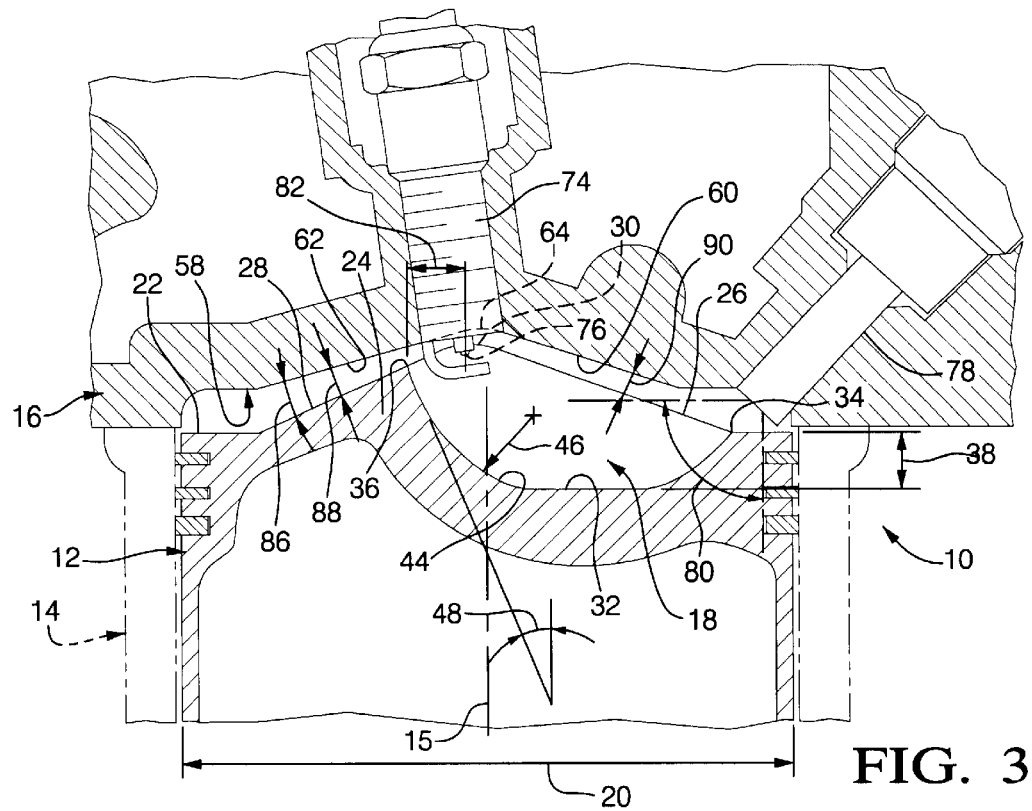
FIG. 3 is a transverse cross-sectional view through the combustion chamber and cylinder head of a preferred embodiment.
Figure 4:
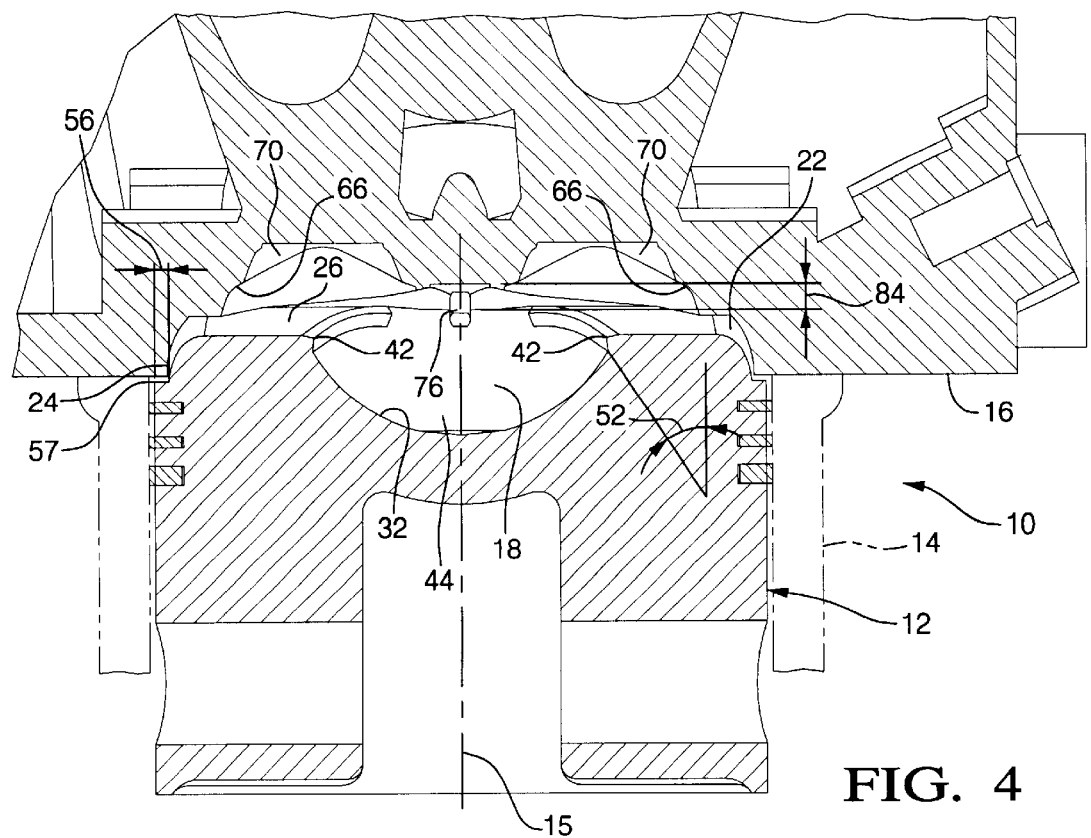
FIG. 4 is a longitudinal cross-sectional view through the combustion chamber and cylinder head of the embodiment of FIG. 3.

Referring now to the drawings in detail, FIGS. 1, 3 and 4 generally illustrates a single cylinder portion of an engine 10 of the reverse tumble spark ignition direct injection type. The engine 10 includes for each cylinder a piston 12 reciprocable in a cylinder 14 on a common axis 15. A cylinder head 16 closes the end of the cylinder to form internally a combustion chamber 18. The cylinder 14 is shown in phantom or omitted from the figures for clarity.

The piston 12 has an outer diameter 20 and a head end 22 having a raised pedestal 24 thereon. The pedestal includes dual shallow upwardly angled intake and exhaust faces 26, 28, respectively, intersecting at a linear peak 30. A shallow bowl 32 is formed in the pedestal 24, primarily in the intake face 26, and extends from an outer side 34 inwardly adjacent an edge of the head at the outer diameter to an inner side 36 slightly beyond the peak 30.

A preferred embodiment of the piston, developed for a cylinder having an 86 millimeter bore has a piston outer diameter 20 of essentially the same dimension. The bowl 32 has a depth 38 from the outer side 34 in a range of about 8–9 millimeters, which is approximately equivalent to a range from 9–10.5 percent of the piston diameter. The bowl has a lateral width 40 between lateral sides 42 of about 42–46 millimeters, approximately equivalent to a range of 48.5 to 53.5 percent of the piston diameter. A mixture preparation surface 44 is provided on the spark plug side of the bowl, that is the inner side 36, formed with a relatively large radius of a curvature 46 of about 24–26 millimeters, equivalent to a range of about 27.5 to 30.5 percent of the piston diameter.

At the inner side, adjacent the spark plug, the bowl has an open inner bowl lip re-entrant angle 48 having a range of about +10 to +15 degrees relative to the piston axis. Along the lateral sides 42 of the bowl, inwardly angled wings are provided which form closed lateral bowl lip re-entrant angles 52 having a range of about −15 to −20 degrees. The inner side bowl lip 36 preferably has a length 54 between about 18–22 millimeters, generally equivalent to about 20.5 to 26 percent of the piston diameter. Finally, along the lateral sides, the minimum distance 56 between the piston pedestal 24 and an adjacent outer edge 57 of the piston is between 2 and possibly 3 millimeters, preferably closer to 2.

The combustion chamber 18 is formed between the head end 22 of the piston and a roof 58 formed by the inner surface of a combustion chamber recess in the lower surface of the cylinder head 6 and closing the end of the cylinder. The roof includes dual shallow upwardly angled intake and exhaust surfaces 60, 62 opposing the intake and exhaust faces 26, 28 of the piston 12 and intersecting at a linear peak 64.

Preferably, dual intake and exhaust ports 66, 68 open through the roof intake and exhaust surfaces 60, 62 respectively (see FIGS. 1 and 4). The intake ports 66 controlled by valves 70 direct intake air flow into the piston bowl 32, generally from its outer side, and lie partially opposite the portions of the intake face on either side of the piston bowl. The exhaust ports with exhaust valves 72 are positioned generally opposite the exhaust face 28 of the piston.

A spark plug 74 extends through the roof 58 having a spark gap 76 adjacent the inner side 36 of the piston bowl. Also, a fuel injection spray nozzle 78 extends through the roof 58 at the cylinder closed end adjacent to the outer side of the piston bowl. The nozzle preferably forms a fuel spray cone angle 80 of approximately 90 degrees during injection of fuel into the cylinder as the piston is rising on the compression stroke.

In FIGS. 3–4, the piston 12 is shown at its top center position wherein the combustion chamber 18 has its minimum volume. It is at this position that internal combustion chamber measurements are taken that will now be described. When the piston is at its top center position, as shown, the spark plug gap 76 is positioned at a distance 82 of about 7–8 millimeters from the adjacent piston bowl lip at the inner side 36 of the piston bowl. The spark gap is also positioned at a distance 84 of about 5–7 millimeters from the adjacent roof peak. This corresponds approximately to a range of 6 to 8.5 percent of the piston diameter.

The combustion chamber roof exhaust surface and the piston exhaust face form an inwardly closing squish angle 86 in a range of about 6–10 degrees while the roof intake surface and the piston intake face are approximately parallel, thus forming a squish angle of about 0 degrees. Further, the exhaust side squish clearance 88 at half cylinder radius is about 3–4 millimeters while the intake side squish clearance 90 at half cylinder radius is about 2–3 millimeters.

Also, in the preferred embodiment, the intake ports 66 are generally vertical and are sized to produce a weak tumbling air flow motion with a reverse tumble ratio of vertical intake air swirl relative to engine rotational speed of about 0.6. The fuel spray nozzle is preferably oriented at an angle of about 47 degrees relative to a horizontal plane, not shown, normal to the common axis 15 of the piston and the cylinder.

The ranges of angles and dimensions indicated above have been developed particularly for an engine having a cylinder and piston diameter of about 86 millimeters. However, certain dimensional relationships may be applied to other piston/cylinder sizes within reasonable limits by scaling the dimensions as a percent of the piston diameter. The following Table A indicates the ranges noted above and their approximate percentage ranges where applicable. It is expected that these percentage ranges may be applied to engines with piston and cylinder diameters in a range of from 76–96 millimeters with equivalent results. While further extension of the ranges may be possible, testing to confirm the results may be required.

TABLE A

| Reference Numeral | Description | Dimension Range of values | Percent of Piston Dia. |
|---|---|---|---|
| 20 | Piston outer diameter | 86 mm. | 100% |
| 38 | Piston bowl depth | 8-9 mm. | 9 to 10.5% |
| 40 | Lateral width of bowl | 42-46 mm. | 48.5 to 53.5% |
| 46 | Radius of curvature of mixture preparation surface | 24-26 mm. | 27.5 to 30.5% |
| 48 | Inner bowl lip re-entrant angle | +10 to +15° | |
| 52 | Lateral bowl lip re-entrant angle | −15 to 20° | |
| 54 | Length of inner bowl lip angle | 18–22 mm. | 20.5 to 26% |
| 56 | Minimum distance between pedestal 24 and outer edge 57 of of piston | 2–3 mm. | |
| 78 | Fuel spray nozzle angle | 47° | |
| 80 | Nozzle spray cone angle | 90° | |
| 82 | Spark gap to bowl lip | 7–8 mm. | |
| 84 | Spark gap to roof peak | 5–7 mm. | 6 to 8.5% |
| 86 | Exhaust squish angle | 6–10° | |
| | Intake squish angle | 0° | |
| 88 | Exhaust squish clearance | 3–4 mm. | |
| 90 | Intake squish clearance | 2–3 mm. | |
| | Reverse tumble ratio of vertical swirl to engine RPM | 0.6 | |

Some of the advantages of the various dimensional characteristics of the combustion chamber illustrated are as follows. The relatively weak tumble ratio of 0.6 has the advantage of higher flow efficiency of the port so that the engine may produce higher power than ports sized for a greater tumble ratio. The 90 degree spray cone angle of the injector must of course be correlated with the size of the piston bowl and the amount of squish or inward flow of air during the compression stroke of the engine so as to capture all of the air fuel mixture after injection and retain it in the piston bowl during combustion. This is aided by the closed or negative re-entrant angles provided by the wings on the lateral edges of the piston bowl. The open positive re-entrant angle on the inner side of the bowl adjacent the spark plug aids in providing a rich combustible mixture at the spark plug gap at the time of ignition. The amount of squish flow developed during the compression stroke is important in driving the air fuel mixture into the combustion bowl without carrying the combustible mixture away from the spark gap.

The size of the bowl must be optimized to obtain the most favorable hydrocarbon emissions. Too large a bowl causes the mixture to become too lean at the side extremes of the bowl and causes unburned hydrocarbon emissions to increase while too narrow a bowl causes part of the spray to not enter the bowl which also causes an increase in hydrocarbon emissions.

The large radius of curvature 46 of the mixture preparation surface 44 combined with the weak tumble ratio of 0.6 operates to promote even spreading of the fuel around the bowl after the fuel spray impacts on the surface. It helps the soft spray to travel on towards the spark plug and insure the existence of the combustible mixture at the spark gap at the time of ignition. Too small a radius of curvature decelerates the spray and compromises the ignition timing as well as the ignition process itself. Too large a radius of curvature causes a large fraction of the fuel vapor to escape beyond the spark plug gap into the squish region on the exhaust side of the chamber and causes poor ignition and unburned hydrocarbons.

The piston bowl depth is also important because, if it is too small, the fuel is not contained within the bowl, adversely affecting hydrocarbon emissions and fuel consumption. The distance between the spark plug gap and the edge of the bowl should be as short as possible. However, with a 14 millimeter spark plug, a value less than 7 millimeters is not practical unless the spark plug is oriented to avoid contact of the ground electrode with the piston. The protrusion of the spark plug into the combustion chamber is kept relatively low by the choice of other dimensional features and is selected as a trade off between fuel consumption and smoke.

The exhaust and intake side squish clearance dimensions 88, 90 and the exhaust squish angle are selected to assist in maintaining the fuel mixture within the piston bowl and its clearance volume before and during combustion. The bowl volume ratio, defined as the piston bowl volume including the clearance space over the bowl divided by the total combustion chamber volume at piston top center, is chosen to best contain the mixture in the bowl while avoiding overly lean or rich regions. A range of from 0.5 to 0.6 is recommended for this ratio.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A piston for a reverse-tumble spark-ignition direct-injection engine, said piston comprising:
    an outer diameter and a head end having a raised pedestal thereon with dual shallow upwardly angled intake and exhaust faces intersecting at a linear peak;
    a shallow bowl formed primarily in the intake face and extending from an outer side adjacent an edge of the head to an inner side slightly beyond the peak, a bowl lip re-entrant angle on the inner side in a range from about plus 10 to plus 15 degrees and bowl lip re-entrant angles in a range from about minus 15 to minus 20 degrees along lateral sides between the inner and outer sides.

2. A piston as in claim 1 wherein, relative to said outer diameter, the bowl has a depth below the piston outer side in a range from about 9 to 10.5 percent and a width between the lateral sides in a range from about 48.5 to 53.5 percent, a mixture preparation surface between a fuel spray portion adjacent the outer side and an ignition portion adjacent the inner side, the mixture preparation surface having, relative to said outer diameter, a radius of curvature in a range from about 27.5 to 30.5 percent.

3. A piston as in claim 2 wherein, relative to said outer diameter, the bowl lip re-entrant angle on the inner side has a length in a range of about 20.5 to 26 percent.

4. A piston as in claim 3 wherein the minimum distance between the piston pedestal and an adjacent outer edge of the piston is in a range of about 2–3 mm.

5. A combustion chamber for a reverse-tumble spark-ignition direct-ignition engine, the combustion chamber comprising:
    a piston as in claim 1;
    a cylinder having a closed end, the piston being reciprocable in the cylinder wherein the combustion chamber is defined by the closed end of the cylinder and the head end of the piston, the piston having a top center position at which the combustion chamber has a minimum volume;
    the cylinder closed end including a raised combustion chamber roof with dual shallow upwardly angled intake and exhaust surfaces opposing the intake and exhaust faces of the piston, the dual roof surfaces intersecting at a linear peak;
    a valved intake port opening through the roof intake surface opposite the outer side of the piston bowl and a valved exhaust port opening through the roof exhaust surface opposite the exhaust face of the piston, a spark plug extending through the roof with a gap adjacent the inner side of the piston bowl and a fuel injection spray nozzle extending through the cylinder closed end adjacent the outer side of the piston bowl.

6. A combustion chamber as in claim 5 wherein the injection nozzle has a fuel spray cone angle of about 90 degrees.

7. A combustion chamber as in claim 5 wherein the injection nozzle is oriented at an angle of about 47 degrees relative to a plane normal to a central axis of the cylinder.

8. A combustion chamber as in claim 5 wherein the intake port is sized to provide a reverse tumble ratio of vertical intake air swirl relative to engine rotational speed of about 0.6.

9. A combustion chamber as in claim 5 wherein at piston top center the distances from the spark plug gap to the adjacent piston bowl lip and to the cylinder roof peak are in ranges from about 7–8 mm and 6 to 8.5 percent of the piston outer diameter, respectively.

10. A combustion chamber as in claim 5 wherein at piston top center the combustion chamber roof exhaust surface and the piston exhaust face form an inwardly closing squish angle in a range from about 6 to 10 degrees while the roof intake surface and the piston intake face are approximately parallel.

11. A combustion chamber as in claim 5 wherein at piston top center the exhaust side squish clearance at half cylinder radius is in a range from about 3–4 mm and the intake side squish clearance at half cylinder radius is in a range from about 2–3 mm.

12. A combustion chamber for a reverse-tumble spark-ignition direct-ignition engine, the combustion chamber comprising:

A piston having an outer diameter and a head end with a raised pedestal thereon having dual shallow upwardly angled intake and exhaust faces intersecting at a linear peak, a shallow bowl formed primarily in the intake face and extending from an outer side adjacent an edge of the head to an inner side slightly beyond the peak, wherein, relative to the piston outer diameter, the bowl has a depth below the outer side in a range from about 9 to 10.5 percent, a width between lateral sides in a range from about 48.5 to 53.5 percent, a mixture preparation surface between a fuel spray portion adjacent the outer side and an ignition portion adjacent the inner side, the mixture preparation surface having, relative to the piston outer diameter, a radius of curvature in a range from about 27.5 to 30.5 percent, a bowl lip re-entrant angle on the inner side in a range from about plus 10 to plus 15 degrees and bowl lip re-entrant angles along the lateral sides in a range from about minus 15 to minus 20 degrees, the bowl lip re-entrant angle on the inner side having, relative to the piston outer diameter, a length in a range from about 20.5 to 26 percent;

a cylinder having a closed end, the piston being reciprocable in the cylinder wherein the combustion chamber is defined by the closed end of the cylinder and the head end of the piston, the piston having a top center position at which the combustion chamber has a minimum volume, the cylinder closed end including a raised combustion chamber roof with dual shallow upwardly angled intake and exhaust surfaces opposing the intake and exhaust faces of the piston, the dual roof surfaces intersecting at a linear peak, a valved intake port opening through the roof intake surface opposite the outer side of the piston bowl and a valved exhaust port opening through the roof exhaust surface opposite the exhaust face of the piston, a spark plug extending through the roof with a gap adjacent the inner side of the piston bowl and a fuel injection spray nozzle extending through the cylinder closed end adjacent the outer side of the piston bowl, the injection nozzle having a fuel spray cone angle of about 90 degrees;

wherein at piston top center, the distances from the spark plug gap to the adjacent piston bowl lip and the cylinder roof peak are in ranges from about 7–8 mm and from about 6 to 8.5 percent of the piston outer diameter, respectively, the combustion chamber roof exhaust surface and the piston exhaust face form an inwardly closing squish angle in a range from about 6–10 degrees while the roof intake surface and the piston intake face are approximately parallel, and the exhaust side squish clearance at half cylinder radius is in a range of about 3–4 mm while the intake side squish clearance at half cylinder radius is in a range of about 2–3 mm.

13. A combustion chamber as in claim 12 wherein the intake port is sized to provide a reverse tumble ratio of vertical intake air swirl relative to engine rotational speed of about 0.6.

14. A combustion chamber as in claim 13 wherein the injection nozzle is oriented at an angle of about 47 degrees relative to a plane normal to a central axis of the cylinder.

15. A combustion chamber as in claim 14 wherein the minimum distance between the piston pedestal and an adjacent outer edge of the piston is in a range from about 2–3 mm.

* * * * *